No. 646,923. Patented Apr. 3, 1900.
E. A. SPERRY.
CELLULOSE ENVELOP FOR ELEMENTS OF STORAGE BATTERIES.
(Application filed Oct. 7, 1899.)

(No Model.)

Witnesses:
L. C. Hills
W. R. Taylor.

Inventor:
Elmer A. Sperry

UNITED STATES PATENT OFFICE.

ELMER A. SPERRY, OF CLEVELAND, OHIO.

CELLULOSE ENVELOP FOR ELEMENTS OF STORAGE BATTERIES.

SPECIFICATION forming part of Letters Patent No. 646,923, dated April 3, 1900.

Application filed October 7, 1899. Serial No. 732,859. (No specimens.)

*To all whom it may concern:*

Be it known that I, ELMER A. SPERRY, a citizen of the United States, residing at Cleveland, in the county of Cuyahoga and State of Ohio, have invented certain new and useful Improvements in Cellulose Nitrate Fabrics—Cellulose Envelops for Elements of Storage Batteries—of which the following is a specification.

My invention relates to separators or envelops for elements of batteries; and it consists in an improved material of which such separators or envelops may be constructed, the characteristics of which are fully described in the following specification, the novelty being pointed out in the claims hereto annexed, being also illustrated in the accompanying drawings, in which—

Figure 1:
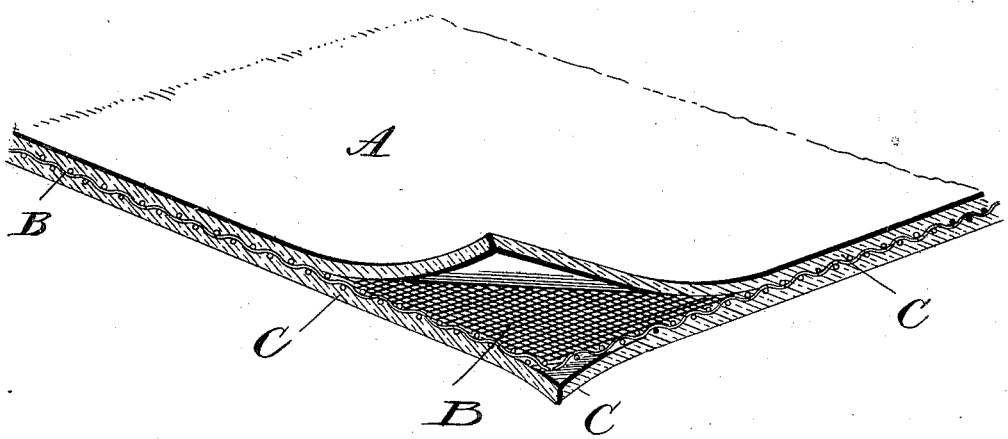
Figure 2:
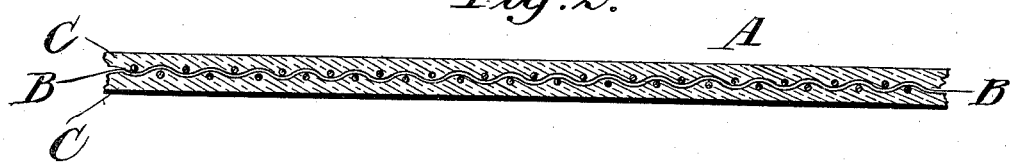
Figure 3:
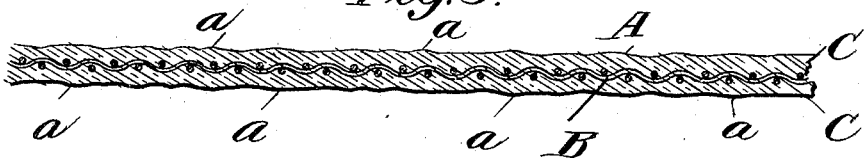

Figure 1 of the accompanying drawings shows one form of the envelop or diaphragm. Fig. 2 shows an edge or sectional view. Fig. 3 is also an edge or sectional view showing wavy or corrugated surface.

Similar letters of reference refer to like parts throughout the figures.

In the drawings the diaphragm or separator is illustrated at A. It is shown as made up of a plurality of layers, the drawings simply indicating that upon each side of the pyroxylin fabric B there is a layer of suitable fiber C, the nature of which is more fully pointed out in the specification.

In Fig. 3 the undulating, corrugated, or ribbed surface is indicated by the ribs shown by projections $a$ $a$, &c.

It has been found that in battery elements, especially storage-battery elements, the active material more or less readily disintegrates and tends to fall from the plate, accumulating in the bottom of the cell. It has, furthermore, been found that with an envelop if properly constructed from substance permeable to the electrolyte and such as not to interfere with the traverse of the ions this material or substance may be retained mechanically in position, and while, on the one hand, the action is entirely unimpeded, on the other the active material is retained and the capacity of the battery does not deteriorate, as in the case where the active material is allowed to fall away from the plate or electrode. For this purpose I have used cellulose of special form and of such a material and structure as will retain its rigidity and inflexibility to a considerable degree. This I have found is best attained by using pure cellulose and in treating fiber in which the non-cellulosic constituents belong to the class of aldehydes and which I remove by the action of sulfurous acid, yielding thereby a fiber in which the ordinary strength is entirely preserved and one that can be used for the purpose and in the manner described. I have found that fibers treated with alkaline processes are short, brittle, and not suitable for battery purposes, especially when used in connection with a sulfuric-acid electrolyte. It has also been found that the individual fibers are rendered to a considerable extent more inert by being subjected to the action of sulfurous acid a second time with an intervening washing. To distinguish this product from the ordinary and less inert forms of sulfite fiber, I call it "double sulfite fiber." In this way the aldehydes are more thoroughly eliminated and the fiber is found to be almost perfectly inert in the liquid electrolyte described and unaffected by the nascent oxygen and hydrogen developed at the poles, while this fiber is found to yield excellent results, especially when corrugated or ribbed and treated and utilized as described in my application for United States Patent, Serial No. 689,057, filed August 19, 1898. I have found, however, that the stiffness and general durability of the envelop may be still further improved by the addition of pyroxylin. This I prefer to make of a fabric consisting of cotton—as, for instance, sea-island cotton—which is prepared in a peculiar manner in regard to three features.

First. The nitrogenizing process is carried on to a point where just the right amount of nitrogen is present, giving the fiber of the fabric a maximum tenacity, as is well known in the art.

Second. The flexibility of the pyroxylin fiber, and therefore of the fabric, I find to be somewhat improved by adding a trifle of vaseline; but with some processes of pulping and mixture with the cellulose this is found to be objectionable. In some instances, however, the pyroxylin fabric so treated may be used with success.

Third. During the latter part of the process or, in fact, in any part of the process of nitrogenizing or in the washing the fabric is treated with just sufficient nitrobenzol or equivalent to render the same not spontaneously explosive; but this is not necessary to the invention, and some of the special processes and treatment described in connection with the preparation of pyroxylin fabric may be eliminated and others used, and the invention extends to such use.

The cotton fabric of which the cellulose is made is preferably woven with open mesh and light, similar to ordinary cheese-cloth or the like, although any fabric that is found to be especially applicable to any particular purpose may be employed. There are numerous ways in which the cellulose fiber may be applied commingled or interspersed—as, for instance, in a plurality of layers—with this network or nets of pyroxylin. For instance, it may be applied in sheet form upon one or both sides or in alternating layers or cemented with suitable cement—for instance, such a one as is not acted upon by the electrolyte; but I prefer to apply it in the pulp form and find that, while it is advisable to have an equal application upon either side of the fabric, the pulp easily penetrates and the fabric sinks into the mass of pulp when the flotation in the matrix-machine is applied to one side only of the fabric. When applied to both sides of the fabric, the machine is prepared with a plurality of cylinders, where the two or more filaments of the cellulose are floated out and separately applied upon either side of the pyroxylin fabric or fabrics, all going forward from this point on as a single sheet or mass.

For the purpose of increasing the rigidity of the sheet the applied fibers are preferably longer than the distance across the mesh or openings in the pyroxylin layer or mass in one line more than another. In addition to the means resorted to, presently to be described, I find that this result may be facilitated by selecting a fabric or preparing a special fabric for the nitrogenizing process which shall have more or larger threads in its woof than in its warp, or vice versa, and then still aiding the process by floating the cellulose fibers parallel to the direction taken up by the larger threads within the fabric now to be described.

It is sometimes found desirable to increase the rigidity or inflexibility of the sheet or envelop in one line more than another within the sheet. This I have been enabled to accomplish by a unilinear disposition of the cellulose fibers within the sheet, accomplished, preferably, by a flowing or so directing the water upon the pulping or matrix blanket that the majority of the cellulose fibers will take up a single unilinear direction within such matrix and eventually within the sheet. This does not mean that all the cellulose fibers in the sheet are parallel; but there is a direction easily discernible which indicates the direction of more fibers than any other line within the sheet, and the sheet is found to be more rigid to a bending moment applied at right angles to this line. When the matrix so constructed is prepared for use in sheet form, I prefer to subject it to a considerable pressure, which may be done in any well-known way, either by passing it through rollers or between plates at any point in the process of manufacture, and I find that the density and stability of the sheet after submersion in the electrolyte is improved if the sheet is subjected to the combined action of heat and pressure. For some special purposes it is found desirable to increase its rigidity or inflexibility in one line more than another. This I accomplish by corrugating the sheet in any of the well-known manners. This may be done by using a ribbed blanket on the pulping-machine or by corrugated rollers in the rolling process above referred to. I do not care to limit myself to any particular process of corrugation or style or configuration of the irregularity of surface constituting the corrugation.

I have employed the term "pyroxylin" as indicating the various forms of cellulose nitrates or nitrogen cellulose. The hexanitrate and others in the series may be employed. The only point as to the exact constituents of the compound is that which, taken with the particular fiber originally employed, will give a nitrogen-cellulose of the maximum strength, durability, and tenacity. The reason why I prefer to use the word "pyroxylin" in this case as a generic term is that in its preferred form the nitrocellulose is not spontaneously explosive and as herein used is only considered in connection with its mechanical properties. The term "guncotton" would be misleading, and again using the generic term "nitrogen cellulose" it brings throughout the specification and claims in juxtaposition two expressions containing the word "cellulose," which might lead to confusion.

It will be readily understood that while it is designed to use the above parts in the relation shown, yet some may be used without the others, and the invention extends to such use. It will furthermore be readily understood that while the detailed construction has been described with more or less minuteness, yet the invention should be in no wise restricted to the exact methods and details described, but rather should be limited only in scope, as indicated in the claims.

Having thus described my invention, what I claim as new, and desire to secure by Letters Patent, is—

1. An envelop or separator for elements of batteries, consisting of a layer of pyroxylin fabric and a layer of cellulose.

2. An envelop or separator for elements of batteries, consisting of a layer of pyroxylin fabric and a layer of cellulose on each side of the fabric.

3. A diaphragm for batteries, consisting of a layer of pyroxylin fabric and a layer of cellulose composed of fibers longer than the distance across the openings or mesh of the pyroxylin fabric.

4. An envelop or separator for elements of batteries, consisting of a layer of pyroxylin fabric and a layer of sulfite fiber.

5. An envelop or separator for elements of batteries, consisting of a layer of pyroxylin fabric, and a layer of cellulose in sheet form, having one or more surfaces, ribbed or corrugated.

6. An envelop or separator for elements of batteries, consisting of a compressed mass in sheet form, constituted of a layer of pyroxylin fabric and a layer of cellulose.

7. An envelop or separator for elements of batteries, consisting of a layer of pyroxylin fabric and a layer of cellulose fiber, the fibers being parallelly disposed within the mass and in line with the warp or woof of the fabric.

8. An envelop or separator for elements of batteries, consisting of a layer of pyroxylin fabric, in which the warp and woof are dissimilar as to coarseness or weight, and a layer of cellulose.

9. An envelop or separator for elements of batteries, consisting of a layer of pyroxylin fabric, in which the warp and woof are dissimilar as to coarseness or weight, and a layer of cellulose fiber, the fiber being parallelly disposed within the mass.

10. An envelop or separator for elements of batteries, consisting of a layer of pyroxylin fabric, in which the warp and woof are dissimilar as to coarseness or weight, and a layer of cellulose fiber, the fibers being disposed parallel to the heavier texture elements.

11. As an article of manufacture, a separator or envelop for elements of batteries, consisting of a network or mesh of cellulose nitrate fiber, impermeable to the electrolyte, to which it is applied and a layer of cellulose fiber, permeable to the electrolyte, substantially as specified.

12. A diaphragm for batteries, consisting of an open-meshed pyroxylin fabric, the fibers of which are impermeable to the electrolyte, associated with a suitable fiber permeable to the electrolyte, for increasing the mass of the diaphragm.

13. A diaphragm for a battery, consisting of an open-mesh pyroxylin fabric, insoluble in the electrolyte, associated with suitable non-woven fiber for increasing the mass of the diaphragm.

ELMER A. SPERRY.

Witnesses:
W. S. ROGERS,
H. W. LAMBLEY.